US010866215B2

(12) United States Patent
Hennig

(10) Patent No.: US 10,866,215 B2
(45) Date of Patent: Dec. 15, 2020

(54) DEVICE WITH A PROTECTIVE DEVICE FOR INSPECTION OF A PIPE WALL OR OTHER WORKPIECE

(71) Applicant: NDT Global Corporate Ltd., Dublin (IE)

(72) Inventor: Thomas Hennig, Dublin (IE)

(73) Assignee: NDT Global Corporate LTD., Dublin (IE)

( * ) Notice: Subject to any disclaimer, the term of this patent is extended or adjusted under 35 U.S.C. 154(b) by 74 days.

(21) Appl. No.: 16/300,194

(22) PCT Filed: May 11, 2017

(86) PCT No.: PCT/EP2017/061309
§ 371 (c)(1),
(2) Date: Nov. 9, 2018

(87) PCT Pub. No.: WO2017/194667
PCT Pub. Date: Nov. 16, 2017

(65) Prior Publication Data

US 2019/0219546 A1 Jul. 18, 2019

(30) Foreign Application Priority Data

May 11, 2016 (DE) ........................ 10 2016 108 744

(51) Int. Cl.
*G01N 29/04* (2006.01)
*G01N 29/22* (2006.01)
(Continued)

(52) U.S. Cl.
CPC ............. *G01N 29/32* (2013.01); *G01N 27/72* (2013.01); *G01N 29/043* (2013.01);
(Continued)

(58) Field of Classification Search
CPC .... G01N 29/043; G01N 27/72; G01N 29/225; G01N 29/32; G01N 2291/102; G01N 2291/2636
(Continued)

(56) References Cited

U.S. PATENT DOCUMENTS 3,257,843 A 6/1966 Cowan
3,636,756 A 1/1972 White
(Continued)

FOREIGN PATENT DOCUMENTS

DE 19909528 A1 9/2000
DE 102008054250 A1 4/2010
(Continued)

OTHER PUBLICATIONS

Office Action issued in DE 10 2016 108 744.0, dated Apr. 20, 2017, 13 pgs.
(Continued)

*Primary Examiner* — Jacques M Saint Surin
(74) *Attorney, Agent, or Firm* — Greenberg Traurig, LLP

(57) ABSTRACT

The invention relates to a device for examining a workpiece, wherein the device comprises a carrier; at least one transceiver, which is arranged on the carrier; and a protective device, which is designed to protect the at least one transceiver from soiling. The invention further relates to a system for examining a workpiece, comprising such a device.

9 Claims, 5 Drawing Sheets

100
14
16
12
12
12
12
10

(51) Int. Cl.
*G01N 27/72* (2006.01)
*G01N 29/32* (2006.01)

(52) U.S. Cl.
CPC ..... *G01N 29/225* (2013.01); *G01N 2291/102* (2013.01); *G01N 2291/2636* (2013.01)

(58) Field of Classification Search
USPC .......................................................... 73/592
See application file for complete search history.

(56) References Cited

U.S. PATENT DOCUMENTS

| | | | | |
|---|---|---|---|---|
| 5,029,614 | A * | 7/1991 | Lara | F16L 55/1283 138/89 |
| 6,196,075 | B1 * | 3/2001 | Comello | G01N 27/902 73/865.8 |
| 6,243,657 | B1 * | 6/2001 | Tuck | G01N 29/2412 702/150 |
| 8,789,422 | B2 | 7/2014 | Ege et al. | |
| 2003/0083576 | A1 * | 5/2003 | Bazarov | G01N 29/265 600/437 |
| 2004/0217759 | A1 * | 11/2004 | Burkhardt | G01N 27/902 324/220 |
| 2006/0220640 | A1 * | 10/2006 | Thompson | G01N 27/902 324/220 |
| 2010/0212749 | A1 * | 8/2010 | Harvey | F16L 55/38 137/13 |
| 2012/0085164 | A1 * | 4/2012 | Roehrig | G01F 15/14 73/273 |
| 2015/0309007 | A1 | 10/2015 | Bellotti et al. | |

FOREIGN PATENT DOCUMENTS

| | | | |
|---|---|---|---|
| DE | 10 2011 018 210 | A1 | 3/2012 |
| GB | 1118141 | | 6/1968 |
| GB | 2 227 805 | A | 8/1990 |
| WO | 8002074 | A1 | 10/1980 |
| WO | 95/06245 | A1 | 3/1995 |

OTHER PUBLICATIONS

ISA/EP, International Search Report and Written Opinion issued on PCT application No. EP2017/061309, dated Jul. 20, 2017, 8 pages.

* cited by examiner

DEVICE WITH A PROTECTIVE DEVICE FOR INSPECTION OF A PIPE WALL OR OTHER WORKPIECE

TECHNICAL FIELD

The present invention relates to a device for inspection of a pipe wall or other workpiece, in particular for an inspection device used in pipeline testing, which is also referred to as a pig.

BACKGROUND

Pipelines are used in many areas for transportation of fluids. In order to ensure a preferably low-loss and safe transport of the fluid it is indispensable in addition to a final inspection of the pipeline after its installation to inspect the pipeline for imperfections at certain time intervals or after detection of leakage.

For this purpose the pipeline to be inspected can be tested nondestructively and in-situ during operation using ultrasound, eddy current or magnetic leakage flux, for example. In such an inspection, for example, an arrangement of ultrasonic transceivers is mounted on a so-called pig and the pig is inserted into the line. The pig then travels through the pipeline, irradiates the inner wall of the pipe with ultrasound and records the received signals as a function of the of the distance traveled. After completion or even during the inspection the received signals can be read out and analyzed.

Such a pig can be driven independently and/or passively by a fluid flowing through the pipeline to be inspected. Fluids can include both liquids (e.g. oil, water) as well as gases (e.g. natural gas).

A disadvantage of known pigs and test arrangements is that the transceivers can be exposed to harsh conditions in the form of various physical and/or chemical influences during use in the pipeline through which fluid flows and are therefore subject to wear. Related to this, a contamination in the area of the transceivers may occur, which can only be removed to a limited extent or not at all during operation and impairs the measurement results.

Outline of the Invention

A first aspect of the invention relates to a device for inspection of a pipe wall or other workpiece which comprises a support, at least one transceiver arranged on the support, and a protective device adapted to protect the transceiver against contamination.

The transceiver may, for example, be an electro-acoustic ultrasonic transducer or sensor. Alternatively or in addition to the use of ultrasound, the use of (electro-) magnetic signals is also possible.

The protective device can be detachably fastened to the support. For example, the protective device can have the form of a cover which is plugged onto the support and over said at least one transceiver. On the one hand, this closes gaps between the transceivers in which dirt can accumulate. On the other hand, the protective device can be replaced relatively easily and quickly.

Alternatively, the protective device can be firmly connected to the support. This can be achieved, for example, by injecting or casting the material of the protective device—such as a suitable plastic or a suitable resin—onto the support during manufacture. This measure can also close any gaps between the transceivers in which dirt may accumulate.

The support may have at least one recess and the at least one transceiver may be inserted into one of the at least one respective recesses. The protective device may be so designed and inserted into the at least one recess that it closes the at least one recess. Depending on the number of transceivers, the protective device may consist of a corresponding number of individual elements, each of which is assigned to one of the transceivers and is inserted into the respective recess in such a way that it protects the transceiver to which it is assigned against contamination. The protective device or individual elements of the protective device are preferably designed in such a way that they close or seal off the respective transceiver from the outside world.

In a particularly preferred embodiment, the protective device is or comprises a membrane. Herein (i) the support may have a recess, (ii) the at least one transceiver may be located in the recess, and (iii) the membrane may be located (at least) above the recess in the support. For example, the membrane may completely cover or span the recess. In particular, the membrane may cover or span the recess in such a way that a medium located in the recess and surrounding the transceiver (for example water) is “enclosed” in the recess by the membrane, in particular free of bubbles. If ultrasound is used, the medium enclosed in this way can serve as a coupling medium.

The membrane can be arranged on the support in such a way that it rolls along the pipe wall or the other workpiece upon a movement of the support and a simultaneous contact of the membrane with the pipe wall or the other workpiece. The rolling can be done actively (with an appropriate mechanism/drive) or passively (by moving the support relative to the pipe wall/the workpiece). The membrane protects the transceiver from dirt and reduces friction losses or any abrasion of the transceiver by contact with the pipe wall/the workpiece, respectively.

In addition or alternatively, the device may comprise a unit or a means for applying liquid to at least a part of the protective device, in particular the membrane. The means for applying liquid may, for example, be designed in the form of one or more nozzles. By means of the application a liquid film can form on the protective device, in particular on the membrane. Alternatively or simultaneously the liquid film can be applied also on the pipe wall or the other workpiece, in particular in the direction of movement shortly “before” the device. This measure can also (further) reduce the friction loss when moving the device relative to the pipe wall/the workpiece. Furthermore, the introduction of liquid between at least a part of the protective device, in particular the membrane, and the pipe wall improves the measuring performance of the device.

Furthermore, the device may also include a unit or a means for removing liquid, for example a suction device, from the protective device or the pipe wall/the other workpiece, respectively. This allows recycling of the liquid—either by introducing the liquid into a reservoir from which the liquid can be removed in turn by the means for applying, or by returning the liquid directly from the means for removing liquid to the means for applying liquid.

According to a second aspect of the present invention, a pig for pipeline testing comprises at least one segment, which in turn comprises at least one device according to a device according to the first aspect. The pig may comprise a generator for converting the kinetic energy of a medium flowing around into energy for operation of the pig. This makes it possible to generate energy for the operation of the pig so that space can be saved—at least in part—that would otherwise be required in whole or in part for a corresponding energy source (such as in the form of batteries). This, in turn, makes it possible to provide any space or additional space at all for a liquid reservoir from which the means for applying liquid mentioned above can extract it and into which the means for removing liquid also mentioned above can discharge it.

SHORT DESCRIPTION OF THE FIGURES

In the following, exemplary embodiments of the invention are described using the following figures.

DETAILED DESCRIPTION

Figure 1:
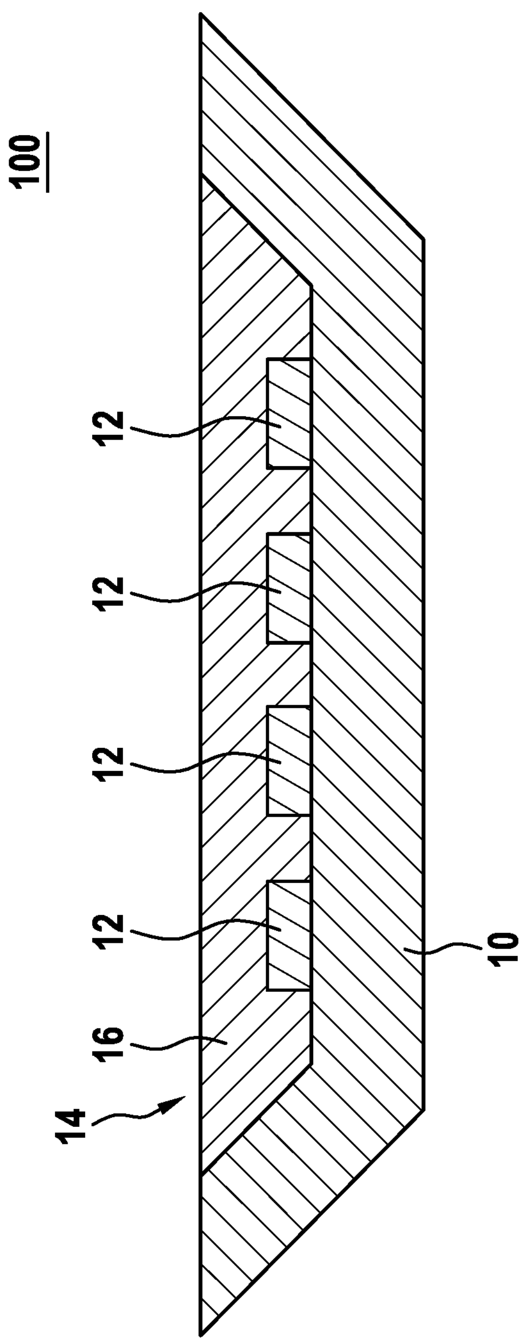
FIG. 1 shows a first embodiment according to the first aspect of the invention.
Figure 2:
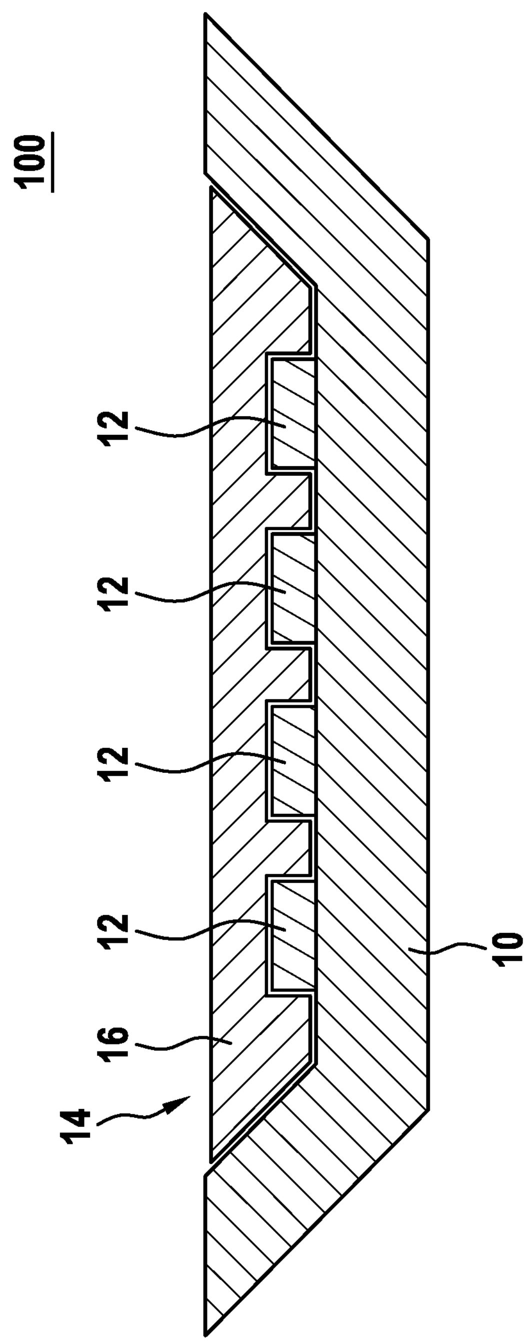
FIG. 2 shows a second embodiment according to the first aspect of the invention.
Figure 3:
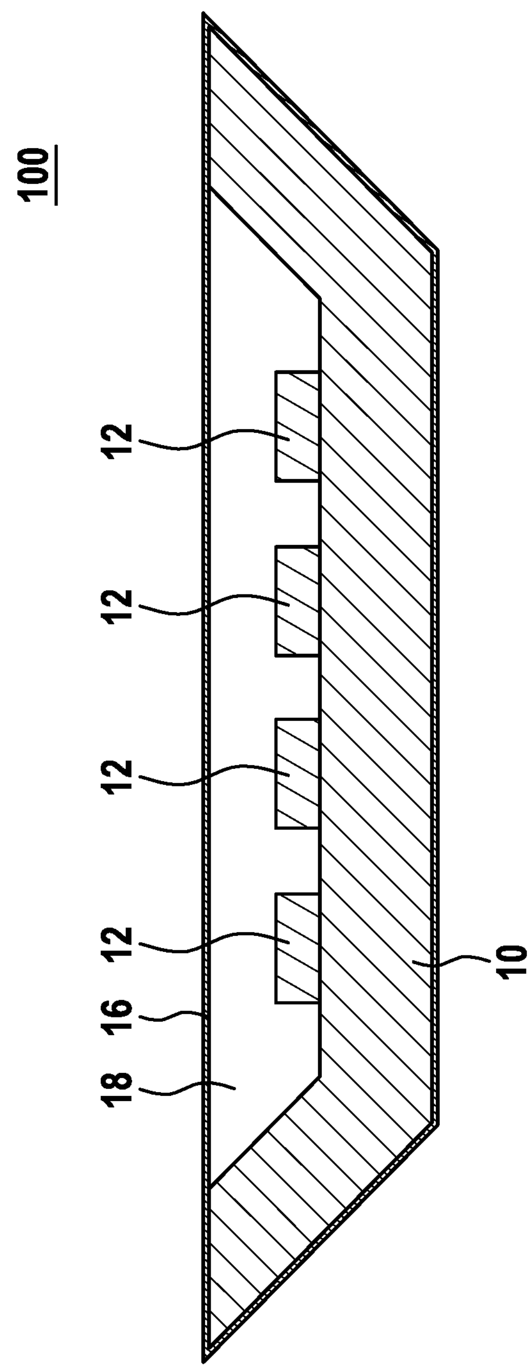
FIG. 3 shows a third embodiment according to the first aspect of the invention.

Exemplary embodiments of devices 100 for inspection of a pipe wall or other workpiece according to the invention are shown in FIGS. 1, 2 and 3.

FIG. 1 shows a cross-sectional view of a device 100 with a support 10 on which four (ultrasonic) transceivers 12 are arranged. The support 10 has a tub-like shape in cross-section, wherein the transceivers 12 are fixed to the bottom of the tub and thus in a recess 14 formed by the tub.

A protective device 16 is also arranged on the support 10. The protective device 16 therein covers the transceivers 12 and protects them from external influences.

The support 10 is usually used in a testing device for workpieces, such as a pig for testing pipe walls for imperfections, cracks or other defects. Therein, the support 10 is brought as close as possible to and ideally in contact with the pipe wall so that the transceivers 12 can transmit (ultrasonic) signals in the direction of the pipe wall and receive a signal response.

By moving the support 10 along the pipe wall (inside or outside), an inspection of the pipe (or the other workpiece) can be performed. The protective device 16 therein protects the transceivers 12, as already mentioned above and as shown in FIG. 1, against physical and chemical influences as well as against contamination by any deposits or other dirt which could accumulate on or between the transceivers 12 without the protective device 16.

The transceivers 12 can all have the same design and operate as both transmitters as well as receivers. Alternatively, some can only be designed and/or operated as transmitters and others only as receivers. The controlling and reading out of the transceivers 12 takes place via a corresponding logic circuit and lines (not shown).

The protective device 16, for example, consists of a hard or viscoplastic material, which exhibits relatively low abrasion when in direct contact with the pipe wall (or other test pieces) and enables transmission of the (ultrasonic) signals from/to the transceivers 12. The material should also be insensitive to the fluid to be transported in the pipe.

The protective device 16 can, for example, be arranged on the support 10 by casting or injecting it using suitable materials and methods.

A further embodiment is shown in FIG. 2. The protective device 16 is designed in the form of a attachable cover which can thus be detachably fastened. This design of the protective device 16 enables an easy replacement of the protective device 16. The small gap between the protective device 16 and the transceivers 12 in FIG. 2 is intended to indicate that the protective device 16 is not permanently or firmly connected to the support 10, respectively, but is simply placed on the support 10 and held in place, for example, by a press fit on the support 10.

FIG. 2 also shows as an example that the side pointing outwards or the sectional drawing according to FIG. 2 does not have to flush the upper edge of the protective device 16 with the legs of the support 10, respectively. Depending on the choice of material for the protective device 16 or/and, more precisely, depending on the combination of the material of the protective device 16, the material of the support 10 and the material of the workpiece to be tested, it may be advantageous, in the two embodiments according to FIG. 1 and FIG. 2, to move the outward facing side of the protective device 16 (slightly) back.

FIG. 3 shows a further embodiment. The support 10 is surrounded by a protective device 16 in the form of a membrane.

The transceivers 12 are arranged in the recess 14 of the support 10 as in the above described embodiments. As shown, the membrane spans the entire support 10. The membrane is thus arranged in particular above the recess 14. The membrane covers the recess 14 and forms a closed volume between itself and the bottom of the recess 14 in the support 10. Alternatively, the membrane can also be arranged in another way above the recess 14, for example, by surrounding only a part of the support 10.

This makes it possible to fill the recess 14 with a medium 18 such as water and to enclose this medium 18 in the recess 14 so that the medium 18 can serve as a coupling medium when ultrasound is used. The medium 18 is preferably enclosed free of bubbles. Furthermore, the membrane protects the transceiver 12 from dirt and reduces friction losses or any harmful effects on the transceiver.

Alternatively, the membrane can also surround only a part of the support 10 and, in a particularly preferred variant, essentially only cover, span or seal the recess 14.

The membrane can be arranged on the support 10 in such a way that it rolls along the pipe wall or other the workpiece upon movement of the support 10 and simultaneous contact with the pipe wall or the other workpiece. For this purpose, winding and unwinding devices or deflecting devices can be arranged (not shown) at suitable points on the support 10. These can be actively (i.e. driven) rolling or passively rolling.

Furthermore, in all the embodiments, the device 100 may comprise a unit or a means for applying liquid to at least a part of the protective device 16, in particular in the embodiment according to FIG. 3, in which the protective device 16 is designed in the form of a membrane. The means for applying liquid may be formed by means of one or more nozzles or other dispensing devices which take liquid from a liquid reservoir (not shown).

By the application of the liquid a liquid film can form on the protective device 16, in particular on the membrane, whereby friction losses during the movement of the device 100 relative to the pipe wall/the workpiece are (further) reduced. This is particularly useful in pipelines through which gases (but not liquids) are passed.

In order to be able to recycle the liquid, a suitable unit or a suitable means for removing liquid from the protective device 16 or the pipe wall/the workpiece may be provided (not shown) on the support 10, for example in the form of a suitable suction/extraction device. This measure can reduce the space required for the liquid reservoir mentioned above or even eliminate it substantially in the event that the liquid is returned directly to the means for applying liquid.

Figure 4:
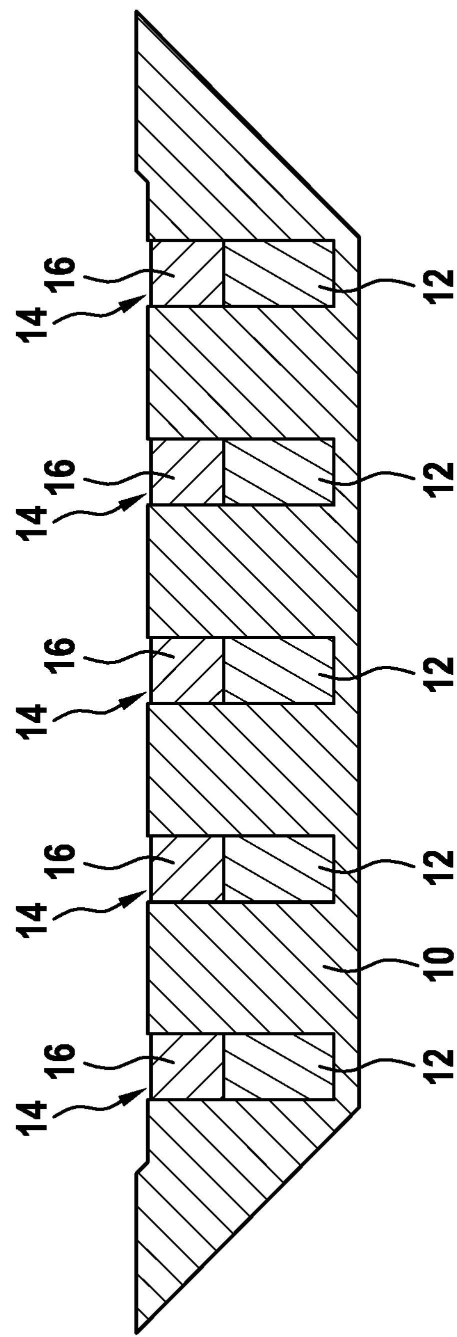
FIG. 4 shows a fourth embodiment according to the first aspect of the invention.
Figure 5:
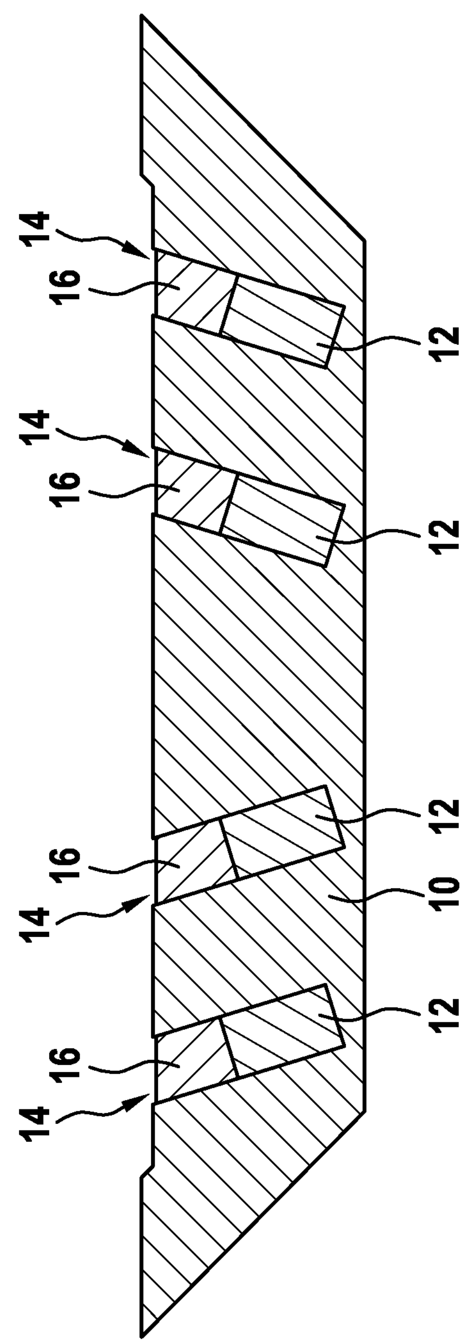
FIG. 5 shows a fifth embodiment according to the first aspect of the invention.

In FIGS. 4 and 5 other advantageous embodiments are shown. The support 10 has four recesses 14, wherein a transceiver 12 is inserted in each of the recesses 14. The protective device 16 in these embodiments comprises individual elements, each of which is inserted in one of the recesses 14, so as to cover the transceiver 12 arranged in this recess 14 and close it to the outside. The individual transceivers 12 can therein point in the same direction or have the same radiation direction (FIG. 4) or have different radiation directions (FIG. 5), respectively.

The above exemplified embodiments of the device 100 can be used in systems for inspection of (metallic) workpieces, for example pipelines. The embodiments are particularly suitable for pigs for pipeline inspection.

The invention claimed is:

1. A device for inspection of a pipe wall or other workpiece which comprises:

a support;

at least one ultrasonic transceiver arranged on said support; and a protective device adapted to protect said at least one ultrasonic transceiver against contamination, wherein said protective device comprises a membrane, said support has a recess, said at least one ultrasonic transceiver is arranged in said recess, and said membrane covers said recess forming a closed volume within said support.

2. The device according to claim 1, wherein said protective device is detachably fastened to said support.

3. The device according to claim 1, wherein said protective device is firmly connected to said support.

4. The device according to claim 1, wherein said protective device is designed and inserted into said recess in such a way that it closes said recess.

5. The device according claim 1, wherein said membrane is arranged on said support such that it rolls along the pipe wall or said other workpiece upon a movement of said support and a simultaneous contact of said membrane with said pipe wall or said other workpiece.

6. The device according to claim 1, further comprising a means for applying liquid to at least a part of said protective device or/and said pipe wall or said other workpiece, respectively.

7. The device according to claim 6, further comprising a means for removing liquid from said protective device or said pipe wall or/and said other workpiece.

8. A pipeline inspection pig, which comprises at least one segment, wherein a segment, and said device comprises:

a support;

at least one ultrasonic transceiver arranged on said support; and a protective device adapted to protect said at least one ultrasonic transceiver against contamination, wherein said protective device comprises a membrane, said support has a recess, said at least one ultrasonic transceiver is arranged in said recess, and said membrane covers said recess forming a closed volume within said support.

9. The pig according to claim 8, wherein the pig comprises a generator for converting kinetic energy of a medium flowing around said pig into energy for operation of the pig.

* * * * *